(12) United States Patent
Mizutani et al.

(10) Patent No.: US 11,214,705 B2
(45) Date of Patent: Jan. 4, 2022

(54) THERMOSETTING COMPOSITION, PAINT FINISHING METHOD, AND METHOD FOR PRODUCING PAINTED ARTICLES

(71) Applicant: Akzo Nobel Coatings International B.V., Arnhem (NL)

(72) Inventors: Hiroki Mizutani, Yokohama (JP); Takahiro Tsujita, Yokohama (JP); Taichiro Kohashi, Yokohama (JP); Nobuhiro Nishida, Yokohama (JP); Koji Miyabe, Yokohama (JP)

(73) Assignee: Akzo Nobel Coatings International B.V.

( * ) Notice: Subject to any disclaimer, the term of this patent is extended or adjusted under 35 U.S.C. 154(b) by 312 days.

(21) Appl. No.: 15/760,833

(22) PCT Filed: Aug. 24, 2016

(86) PCT No.: PCT/EP2016/069984
§ 371 (c)(1),
(2) Date: Mar. 16, 2018

(87) PCT Pub. No.: WO2017/050511
PCT Pub. Date: Mar. 30, 2017

(65) Prior Publication Data
US 2018/0265737 A1 Sep. 20, 2018

(30) Foreign Application Priority Data

Sep. 25, 2015 (JP) .............................. JP2015-188883

(51) Int. Cl.
*C09D 175/06* (2006.01)
*C09D 183/02* (2006.01)
(Continued)

(52) U.S. Cl.
CPC ............. *C09D 175/06* (2013.01); *B05D 1/28* (2013.01); *B05D 3/0209* (2013.01);
(Continued)

(58) Field of Classification Search
None
See application file for complete search history.

(56) References Cited

U.S. PATENT DOCUMENTS

| 4,997,900 A | 3/1991 | Brinkman | |
| 5,482,787 A * | 1/1996 | Sujita | B05D 7/14 |
| | | | 428/623 |

(Continued)

FOREIGN PATENT DOCUMENTS

| CN | 101838498 A | 9/2010 |
| CN | 104540911 A | 4/2015 |

(Continued)

OTHER PUBLICATIONS

International Search Report and the Written Opinion of the International Searching Authority, or the Declaration from the International Bureau of WIPO for International Application No. PCT/EP2016/069984, dated Oct. 12, 2016.

International Preliminary Report on Patentability from the International Bureau of WIPO for International Application No. PCT/EP2016/069984, dated Sep. 5, 2017.

*Primary Examiner* — Francisco W Tschen
(74) *Attorney, Agent, or Firm* — McDonnell Boehnen Hulbert & Berghoff LLP

(57) ABSTRACT

[Purpose] To provide a thermosetting composition with which it is possible to obtain paint films which not only display stain resistance for a short period after application, but with which excellent stain resistance can also be expected for longer periods, and which comply with the paint film properties required for painted steel sheet such as water resistance and bending workability, and have high environmental protection and safety qualities. [Solution] The present invention relates to a thermosetting composition, wherein it contains, as essential components, (A) a polyester resin of number average molecular weight 1,000-10,000 and hydroxyl value 5-200 mg KOH/g and, (B) 0.5 to 2.0 equivalents, relative to the hydroxyl groups of the aforesaid component (A), of a compound (B) which is a blocked aliphatic polyisocyanate compound having reactivity to the hydroxyl groups of component (A), wherein the blocks are methyl ethyl ketone oxime and/or ε-caprolactam, (C) 0.05 to 5 mass %, relative to the total resin solids mass of component (A) and component (B), of an organotin compound represented by the following general formula (I) [Chem.1] $R^1-Sn-(O)C=(O)-R^2)_3$ (I) ($R^1$ in the formula represents an organic group wherein it has 1-24 carbons, and is directly bound to the Sn atom via a C atom. $R^2$ represents an organic group wherein it has 1-24 carbons, and is directly bound to the C atom of the (C=O) via a C atom), and (D) 0.5 to 50 mass %, relative to the total resin solids mass of component (A) and component (B), of an organosilicate represented by the following general formula (II) and/or a condensation product thereof [Chem.2] ($R^3$, $R^4$, $R^5$ and $R^6$ in the formula are each a hydrogen atom or 1-10 carbon organic group, and may be the same or different, n is 1).

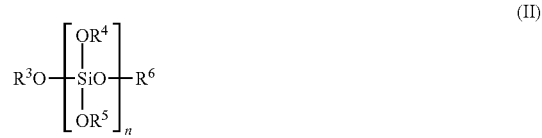

(II)

10 Claims, No Drawings

(51) Int. Cl.
*C08G 18/80* (2006.01)
*C08G 18/24* (2006.01)
*B05D 1/28* (2006.01)
*B05D 3/02* (2006.01)
*C08G 18/38* (2006.01)
*C08G 18/75* (2006.01)
*B05D 7/14* (2006.01)
*C08G 18/42* (2006.01)
*C09D 167/00* (2006.01)
*C08G 18/66* (2006.01)
*C08G 18/73* (2006.01)

(52) U.S. Cl.
CPC ......... *B05D 3/0254* (2013.01); *C08G 18/242* (2013.01); *C08G 18/246* (2013.01); *C08G 18/3893* (2013.01); *C08G 18/4216* (2013.01); *C08G 18/4219* (2013.01); *C08G 18/6633* (2013.01); *C08G 18/73* (2013.01); *C08G 18/755* (2013.01); *C08G 18/807* (2013.01); *C08G 18/8074* (2013.01); *C08G 18/8077* (2013.01); *C09D 167/00* (2013.01); *C09D 183/02* (2013.01); *C08L 2205/03* (2013.01); *C08L 2205/05* (2013.01)

(56) References Cited

U.S. PATENT DOCUMENTS

| | | | |
|---|---|---|---|
| 5,821,314 A * | 10/1998 | Ikushima | C08G 59/306 528/18 |
| 2002/0082341 A1* | 6/2002 | Matsuno | C08L 2666/16 524/589 |
| 2008/0119601 A1* | 5/2008 | Nennemann | C08G 18/289 524/403 |
| 2014/0155545 A1* | 6/2014 | Stanjek | C04B 26/32 524/588 |

FOREIGN PATENT DOCUMENTS

| | | |
|---|---|---|
| EP | 1 973 977 B1 | 8/2019 |
| JP | 2002309170 A | 10/2002 |
| JP | 2002309170 A | 10/2002 |
| JP | 208081719 A | 4/2008 |
| JP | 2009238943 | 10/2009 |
| JP | WO2014/199653 A1 | 12/2014 |
| RU | 2 432 377 C2 | 10/2011 |
| WO | 2012/002095 A1 | 1/2012 |
| WO | 2012/002095 A1 | 1/2012 |
| WO | 2013/093586 A1 | 6/2013 |
| WO | 2013/093586 A1 | 6/2013 |

* cited by examiner

THERMOSETTING COMPOSITION, PAINT FINISHING METHOD, AND METHOD FOR PRODUCING PAINTED ARTICLES

This application is the US national phase under 35 U.S.C. § 371 of international application PCT/EP2016/069984, filed Aug. 24, 2016, which claims priority to Japanese application JP 2015-188883, filed Sep. 25, 2015.

TECHNOLOGICAL FIELD

The present invention relates to a thermosetting composition which is ideal for use for topcoat paints in various fields, especially in the production of painted steel sheet, which does not produce harmful substances such as formaldehyde, has excellent workability and excellent stain resistance, a paint finishing method, and method for producing articles painted therewith. Further, the present invention relates to a paint finishing method with which continuous painting is possible by means of a roller coater used as an ideal production method for large volume production of painted steel sheet, and to method for producing articles painted therewith.

PRIOR ART

Since the surfaces of painted steel sheet which is utilized in building components used outdoors (for example shutters, storm shutters, doors, roof materials and siding materials), outdoor components (for example air conditioner outdoor units) and the like are easily stained by the effects of rain (acid rain), dust and the like, excellent stain resistance is required. Thus, in order to impart stain resistance to painted steel sheet, thermosetting compositions were required with which it is possible to obtain paint films which not only display stain resistance for a short period after application, but with which stain resistance can also be expected for longer periods.

Further, for painted steel sheet for indoor use, thermosetting compositions were required with which it is possible to obtain paint films which reconcile workability and stain resistance, and which do not produce harmful substances such as formaldehyde which is considered to cause sick house syndrome and the like.

Moreover, for painted steel sheet, in terms of high productivity, and as regards production cost, painting in a painting line using a roller coater is the most common painting method.

As such a paint composition with excellent stain resistance, in patent reference 1 a topcoat paint composition is proposed which relative to a resin binder containing both (A) a specific hydroxy group-containing paint film-forming resin and (B) an amino resin crosslinking agent, contains (C) an organosilicate and/or condensation product thereof, (D) a boric acid-based compound, (E) untreated fine particle silica of oil absorbance 100-280 ml/100 g and (F) a titanium dioxide pigment of dry weight-based water content 20-30 ml/100 g, and can form paint films with excellent stain resistance to rain water and the like initially and over time. However, the paint composition of patent reference 1 produces formaldehyde, and its workability was also inadequate.

Further, in patent reference 2, a paint composition is proposed which contains (A) at least one specific resin selected from polyester resin silicone-modified polyester resin and fluorine-containing polyol resin, containing hydroxy groups and of number average molecular weight 1,000-100,000, (B) at least one selected from a (blocked) polyisocyanate, melamine resin, 1,3,5-triazine-2,4,6-tris-carbamate ester and oligomers thereof, (C) at least one inorganic acid sol selected from an aluminum oxide sol, silicon oxide sol and the like, and (D) a silicone compound obtained by condensation polymerization of an (organo) silicate, a partial hydrolytic condensation product thereof and a silane coupling agent, which has excellent external appearance, excellent initial stain resistance, long-term stain resistance, stain removal properties and the like, and has high environmental protection properties and stability. However, there were problems with the paint composition of patent reference 2, in that it has the defect that if painting is performed with a roller coater which is the most common painting method for painted steel sheet because of its high productivity, stable production is impossible because a decrease in gloss and decreases in hydrophilicity and stain resistance occur within a short period, hence for productivity and painting cost reasons it was not in practice usable.

PRIOR ART REFERENCES

Patent References

[Patent Reference 1] Japanese Laid-Open Application 2008-81719 publication
[Patent Reference 2] Japanese Laid-Open Application 2002-309170 publication

OUTLINE OF INVENTION

Problem to be Solved by Invention

Consequently, the present invention provides a thermosetting composition with which it is possible to obtain paint films which not only display stain resistance for a short period after application, but with which stain resistance can also be expected for longer periods, and which comply with the paint film properties required for painted steel sheet such as water resistance and bending workability, and have high environmental protection and safety qualities. Also, continuous painting with a roller coater which is used as an ideal production method for large scale production of painted steel sheet is possible.

Means of Solving Problem

The present inventors, as a result of repeated and diligent research to solve the aforesaid problem, discovered that by combining a specific polyester resin, a blocked aliphatic isocyanate compound, a curing catalyst and an organosilicate the aforesaid problem can be solved, and thus achieved the present invention.

That is to say, the present invention relates to a thermosetting composition, wherein it contains, as essential components, (A) a polyester resin of number average molecular weight 1,000-10,000 and hydroxyl value 5-200 mg KOH/g and, (B) 0.5 to 2.0 equivalents, relative to the hydroxyl groups of the aforesaid component (A), of a compound (B) which is a blocked aliphatic polyisocyanate compound having reactivity to the hydroxyl groups of component (A), wherein the blocks are methyl ethyl ketone oxime (referred to below as MEK oxime) and/or ε-caprolactam, (C) 0.05 to 5 mass %, relative to the total resin solids mass of component (A) and component (B), of an organotin compound represented by the following general formula (I)

[Chem.1]

(R¹ in the formula represents an organic group wherein it has 1-24 carbons, and is directly bound to the Sn atom via a C atom. R² represents an organic group wherein it has 1-24 carbons, and is directly bound to the C atom of the (C=O) via a C atom), (D) 0.5 to 50 mass %, relative to the total resin solids mass of component (A) and component (B), of an organosilicate represented by the following general formula (II) and/or a condensation product thereof

[Chem. 2]

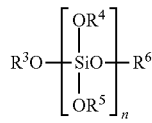

(II)

(R³, R⁴, R⁵ and R⁶ in the formula are each a hydrogen atom or 1-10 carbon organic group, and may be the same or different. n is 1).

Further, the present invention relates to a thermosetting composition wherein, in the aforesaid thermosetting composition, wherein it further contains 1 to 50 mass %, relative to the total resin solids mass of component (A) and component (B), of a compound (E) represented by the following general formula (III).

[Chem.3]

(R⁷ in the formula is a hydrogen atom or 1-10 carbon organic group, R⁸ is a 1-10 carbon organic group, and if there is a plurality of R⁷ and/or R⁸, these may be the same or different, and n is 1 or 2).

Moreover, the present invention relates to a metal sheet paint finishing method, wherein any of the aforesaid thermosetting compositions are applied onto a metal sheet, and thermally cured.

Further, the present invention relates to a metal sheet paint finishing method, wherein an undercoat paint is applied onto a metal sheet and thermally cured, a midcoat paint is as necessary applied on top of that undercoat paint film and thermally cured, and, after this, any of the aforesaid thermosetting compositions are applied as a topcoat paint on top of the paint film, and thermally cured.

Further, the present invention relates to a paint finishing method, wherein a roller coater is used as the painting machine.

Further, the present invention relates to a paint finishing method, wherein the aforesaid metal sheet is any of: cold-rolled steel sheet, zinc-plated steel sheet, aluminum-zinc-plated steel sheet, zinc-magnesium-plated steel sheet, aluminum-zinc-magnesium-plated steel sheet, stainless steel sheet, aluminum sheet or aluminum alloy plate.

Moreover, the present invention relates to a method for producing painted articles, wherein they are formed by the aforesaid paint finishing method.

Effect of Invention

The thermosetting compositions of the present invention have excellent environmental protection properties and safety; further, by means of these thermosetting compositions, paint films can be obtained which not only display stain resistance a short period after application, but with which excellent stain resistance can also be expected over long periods, and which comply with paint film properties essential for painted steel sheet such as water resistance and bending workability. Also, continuous painting in a painting line using a roller coater, which is the most common painting method for painted steel sheet because of its high safety and low production cost, is possible.

EMBODIMENTS OF THE INVENTION

The polyester resin used as component (A) in the thermosetting composition of the present invention can be obtained by known methods using esterification reactions with a polybasic acid and a polyhydric alcohol as the starting compounds.

As the polybasic acid, polybasic carboxylic acids are normally used, but monobasic aliphatic acids can be simultaneously used as necessary. As polybasic acids, for example phthalic acid, isophthalic acid, terephthalic acid, tetrahydrophthalic acid, tetrahydro-isophthalic acid, hexahydrophthalic acid, hexahydro-terephthalic acid, trimellitic acid, adipic acid, sebacic acid, succinic acid, azelaic acid, fumaric acid, maleic acid, itaconic acid, pyromellitic acid, and anhydrides thereof and the like are mentioned. As monobasic aliphatic acids, for example ricinoleic acid, oleic acid, linolic acid, palmitic acid, stearic acid and the like are mentioned. These polybasic acids and monobasic aliphatic acids can be used alone, or can be used as combinations of 2 or more.

As polyhydric alcohols, glycols and trihydric or higher polyhydric alcohols are mentioned. As glycols, for example ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butane-diol, 1,4-butanediol, 1,5-pentanediol, 1,6-hexanediol, 2-butyl-2-ethyl-1,3-propanediol, methylpropanediol, cyclohexanedimethanol, 3,3-diethyl-1,5-pentanediol and the like are mentioned. Further, as trihydric or higher polyhydric alcohols, for example glycerin, trimethylolethane, trimethylolpropane, pentaerythritol, dipentaerythritol and the like are mentioned. These polyhydric alcohols can be used alone, or can be used as combinations of 2 or more.

The number average molecular weight of component (A), with regard to bending workability and stain resistance, is preferably 1,000 to 10,000, more preferably 1,200 to 9,000, and particularly preferably 1,500 to 6,000. In the present invention, the number average molecular weight is the value when the number average molecular weight measured by gel permeation chromatography (GPC) is calculated using the number average molecular weight of polystyrene as the standard. This number average molecular weight is specifically for example 1,000, 1,500, 2,000, 2,500, 3,000, 3,500, 4,000, 4,500, 5,000, 5,500, 6,000, 6,500, 7,000, 7,500, 8,000, 8,500, 9,000, 9,500 or 10,000, and can be in the range between any two of the numerical values indicated as examples here. If the number average molecular weight of component (A) is less than 1,000, the bending workability may decrease. Also, if it is 10,000 or more, the stain resistance may decrease.

In order for stain resistance to appear a short period after painting, the hydroxyl value of component (A) is preferably 5-200 mg KOH/g, more preferably 10-190 mg KOH/g, and particularly preferably 14-180 mg KOH/g. This hydroxyl value is specifically for example 5, 10, 15, 20, 30, 40, 50, 60, 70, 80, 90, 100, 120, 130, 140, 150, 160, 170, 180, 190 or 200, and can be in the range between any two of the numerical values indicated as examples here. If the hydroxyl value is less than 5 mg KOH/g, the stain resistance may decrease. Also, if it is 200 mg KOH/g or more, the bending workability may decrease.

There is no particular restriction as to the acid value of component (A), and for example 2-50 mg KOH/g is preferable.

Component (B) of the thermosetting composition of the present invention is a crosslinking agent which reacts with hydroxyl groups.

As crosslinking agents (B) which react with hydroxyl groups, in terms of bending workability, versatility, paint composition stability and environmental safety, blocked aliphatic isocyanate compounds are particularly preferable.

As blocked polyisocyanate compounds, those where isocyanate groups of the polyisocyanate compound are blocked for example with alcohols such as butanol, oximes such as methyl ethyl ketoxime, lactams such as ε-caprolactam, diketones such as acetylacetone, keto esters such as acetoacetic ester, dicarboxylate esters such as diethylmalonate, imidazoles such as imidazole and 2-ethylimidazole, pyrazoles such as 3-methylpyrazole and dimethylpyrazole, or phenols such as m-cresol are mentioned, but in order to maintain the functions of gloss stability and stain resistance during continuous painting with a roller coater which are characteristics of the present invention, and also to ensure paint viscosity stability and to meet the short baking time, blocked polyisocyanate compounds blocked with methyl ethyl ketoxime, and ε-caprolactam, are particularly preferable.

As polyisocyanate compounds, for example aliphatic diisocyanate compounds such as hexamethylene diisocyanate (HDI), trimethylhexamethylene diisocyanate and dimer acid diisocyanate, and aromatic diisocyanates such as xylylene diisocyanate (XDI), 1,4-phenylene diisocyanate, tolylene diisocyanate (TDI) and 4,4-diphenylmethane diisocyanate (MDI), and also alicyclic diisocyanates such as isophorone diisocyanate (IPDI), hydrogenated XDI, hydrogenated TDI and hydrogenated MDI, and adducts, biurets and isocyanurates thereof, and the like are mentioned, but as regards balance between workability and curing properties, and weather resistance, aliphatic diisocyanate compounds and alicyclic diisocyanate compounds are particularly preferable.

In the thermosetting compositions of the present invention, it is necessary that the blending ratio of component (A) and component (B) be in the range 0.5-2.0 equivalents of blocked isocyanate groups of component (B) relative to hydroxyl groups of component (A), more preferably in the range 0.7-1.5, and most preferably in the range 0.8-1.3. This quantity of equivalents is specifically for example 0.5, 0.6, 0.7, 0.8, 0.9, 1.0, 1.1, 1.2, 1.3, 1.4, 1.5, 1.6, 1.7, 1.8, 1.9 or 2.0, and can be in the range between any two of the numerical values indicated as examples here. If said quantity of equivalents is less than 0.5, since the hydroxyl groups of component (A) remain in excess in the curing reaction of the thermosetting composition, the water resistance of the paint film is impaired, which is undesirable. On the other hand, if said quantity of equivalents exceeds 2.0 equivalents, since blocked isocyanate groups and/or dissociated/reformed isocyanate groups of component (B) remain, the water resistance of the paint film is also impaired, which is undesirable.

Component (C) of the thermosetting composition of the present invention is a curing reaction catalyst for the polyester resin which is component (A) and the blocked aliphatic polyisocyanate compound which is component (B). As curing reaction catalysts, for example metal compounds such as tin compounds or zinc compounds or amines are mentioned, but tin compounds are especially widely used. As tin compounds, for example tin halides such as tin chloride or tin bromide, or organotin compounds such as tin octanoate, dibutyltin diacetate, dibutyltin dioctate, dibutyltin dilaurate, dibutyltin maleate, monobutyltin oxide or dibutyltin oxide, and the like are mentioned, but in terms of maintaining the functions of gloss stability and stain resistance during continuous painting with a roller coater which are characteristics of the present invention, it is in particular necessary that the component (C) of the present invention is an organotin compound represented by the following general formula (I).

[Chem.1]

$$R^1-Sn-(O(C=O)-R^2)_3 \qquad (I)$$

($R^1$ in the formula represents an organic group wherein it has 1-24 carbons, and is directly bound to the Sn atom via a C atom. $R^2$ represents an organic group wherein it has 1-24 carbons, and is directly bound to the C atom of the (C=O) via a C atom).

As examples of organotin compounds represented by the general formula (I), monoethyltin trisacetate, monoethyltin trisbutyrate, monoethyltin tris(2-ethyl-hexanoate), monoethyltin trisoctoate, monoethyltin trislaurate, monoethyltin trisstearate, monobutyltin trisacetate, monobutyltin trisbutyrate, monobutyltin tris(2-ethylhexanoate), monobutyltin trisoctoate, monobutyltin trislaurate, monobutyltin trisstearate, mono(2-ethylhexyl)tin trisacetate, mono(2-ethylhexyl)-tin trisbutyrate, mono(2-ethylhexyl)tin tris(2-ethyl-hexanoate), mono(2-ethylhexyl)tin trisoctoate, mono(2-ethylhexyl)tin trislaurate, mono(2-ethylhexyl)tin trisstearate, mono(n-octyl)tin trisacetate, mono(n-octyl)-tin trisbutyrate, mono(n-octyl)tin tris(2-ethyl-hexanoate), mono(n-octyl)tin trisoctoate, mono(n-octyl)tin trislaurate, mono(n-octyl)tin trisstearate, monolauryltin trisacetate, monolauryltin trisbutyrate, monolauryltin tris(2-ethylhexanoate), monolauryltin trisoctoate, monolauryltin trislaurate, monolauryltin trisstearate and the like are mentioned.

The organotin compounds represented by the general formula (I) can be used alone as curing reaction catalysts, or can be used as combinations of 2 or more.

When an organotin compound (C) is used as the component (C) of the thermosetting compositions of the present invention, the content of the component (C) is preferably 0.05-5 mass % relative to the total resin solids fraction of component (A) and component (B). More preferably, it is 0.07-4 mass %, and particularly preferably 0.1-3 mass %. This mass % value is specifically for example 0.05, 0.06, 0.07, 0.08, 0.09, 0.10, 0.11, 0.15, 0.20, 0.25, 0.30, 0.35, 0.40, 0.45, 0.50, 0.55, 0.60, 0.65, 0.70, 0.75, 0.80, 0.85, 0.90, 0.95, 1.1, 1.2, 1.3, 1.4, 1.5, 1.6, 1.7, 1.8, 1.9, 2.0, 2.5, 3.0, 3.5, 4.0, 4.5 or 5, and can be in the range between any two of the numerical values indicated as examples here. If the content of component (C) is less than 0.05 mass % relative to the total resin solids fraction of component (A) and component (B), the stain resistance may decrease. Further, if it is greater than 5 mass %, the maintenance of the gloss stability and stain resistance properties during continuous painting with a roller coater, which is a characteristic of the present invention, may decrease.

The component (D) of the thermosetting compositions of the present invention is an organosilicate represented by the following general formula (II) and/or a condensation product thereof.

[Chem. 2]

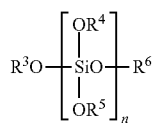
(II)

($R^3$, $R^4$, $R^5$ and $R^6$ in the formula are each a hydrogen atom or 1-10 carbon organic group, and may be the same or different. n is 1).

As examples of the organosilicates represented by the above general formula (II) and/or condensation products thereof, tetramethoxysilane, tetraethoxysilane, tetra-propoxysilane, tetraisopropoxysilane, tetrabutoxysilane, tetraisobutoxysilane and the like, and single or combined condensation products or partial hydrolytic condensation products thereof and the like are mentioned. These single or combined condensation products and partial hydrolytic condensation products of said condensation products and the like are mentioned.

Condensation products or hydrolysis products of organosilicates can be produced by normal methods, but as commercial products, for example the MKC silicates MS51, MS56, MS56S, MS57, MS56SB5, MS58B15, MS58B30, ES40, EMS31 and BTS (all Mitsubishi Chemical (Corp.) brand names), methyl silicate 51, ethyl silicate 40, ethyl silicate 40T, ethyl silicate 48 and EMS-485 (all Colcoat (Corp.) brand names) can be used alone or in combinations of 2 or more. As organosilicate partial hydrolytic condensation products, 2 to 20-mers are preferable. In the thermosetting compositions of the present invention, 1 type of component (D) organo-silicate and/or condensation product thereof can be used, or 2 or more can be used in combination.

The content of the component (D) of the thermosetting composition of the present invention is preferably 0.5-50 mass % relative to the total resin solids fraction of component (A) and component (B). More preferably, it is 0.7-20 mass %, and particularly preferably 1.0-10 mass %. This mass % value is specifically for example 0.5, 0.6, 0.7, 0.8, 0.9, 1, 2, 3, 4, 5, 6, 7, 8, 9, 10, 15, 20, 25, 30, 35, 40, 45 or 50, and can be in the range between any two of the numerical values indicated as examples here. If the content of component (D) is less than 0.5 mass % relative to the total resin solids fraction of component (A) and component (B), the stain resistance may decrease. Further, if it is greater than 50 mass %, the bending workability may decrease.

The thermosetting compositions of the present invention can contain a compound (E) represented by the following general formula (III).

[Chem.3]

(III)

($R^7$ in the formula is a hydrogen atom or 1-10 carbon organic group, $R^8$ is a 1-10 carbon organic group, and if there is a plurality of $R^7$ and/or $R^8$, these may be the same or different, and n is 1 or 2).

As examples of compounds (E) represented by the general formula (III), 2,2-dimethoxypropane, 2,2-diethoxy-propane, 3,3-dimethoxyhexane, 2,2-dibutoxypropane, trimethyl orthoformate, triethyl orthoformate, tri(n-propyl) orthoformate, trialkyl orthoacetates such as trimethyl orthoacetate, triethyl orthoacetate and tributyl orthoacetate, trialkyl orthobutyrates such as trimethyl orthobutyrate and triethyl orthobutyrate, trialkyl orthopropionates such as trimethyl ortho-propionate and triethyl orthopropionate, trialkyl orthovalerates such as trimethyl orthovalerate and triethyl orthovalerate, and the like are mentioned.

The content of the component (E) of the thermosetting composition of the present invention is preferably 0.5-50 mass % relative to the total resin solids fraction of component (A) and component (B). More preferably, it is 0.5-20 mass %, and particularly preferably 0.5-10 mass %. This mass % value is specifically for example 0.5, 0.6, 0.7, 0.8, 0.9, 1, 2, 3, 4, 5, 6, 7, 8, 9, 10, 15, 20, 25, 30, 35, 40, 45 or 50, and can be in the range between any two of the numerical values indicated as examples here. If the content of component (E) is less than 0.5 mass % relative to the total resin solids fraction of component (A) and component (B), the gloss stability and stain resistance functions during continuous painting with a roller coater which are a characteristic of the present invention may decrease. Further, if it is greater than 50 mass %, the paint viscosity decreases, and the painting workability may decrease.

In addition to the aforesaid components, as necessary, various other known components normally used in the coatings field can be incorporated into the thermo-setting compositions of the present invention. Specifically, for example, various surface modifiers such as levelling agents and defoaming agents, various additives such as dispersants, antisettling agents, ultraviolet absorbers, light stabilizers and antiscratch agents, various pigments such as colored pigments and extender pigments, brighteners, organic solvents and the like are mentioned.

The thermosetting compositions of the present invention can be organic solvent-based thermosetting compositions or aqueous thermosetting compositions, but organic solvent-based thermosetting compositions are preferable. As organic solvents, for example one or mixtures of 2 or more ester solvents such as n-butyl acetate, isobutyl acetate, n-pentyl acetate and 3-methoxybutyl acetate, ketone solvents such as methyl isobutyl ketone, cyclohexanone and isophorone, aromatic solvents such as Solvesso 100 and Solvesso 150 (the above are brand names of Exxon-Mobil Chemical Corp.), alcoholic solvents such as butanol and butylcellosolve, and the like are mentioned.

As ideal painting methods using the thermosetting composition of the present invention, methods wherein, after adjusting the thermosetting composition to the desired viscosity as necessary by warming or by adding an organic solvent or reactive diluent, they are applied using a commonly used paint machine such as a paint machine of the air spray, electrostatic air spray, roller coater, flow coater or dipping type, or using a paint brush, bar coater, applicator or the like, such that the paint film thickness after drying is usually 0.5-300 μm, with curing for 5 secs to 24 hours, usually at a temperature of 50-300° C., and the like, are mentioned, but methods wherein it is applied using a roller coater and cured under drying conditions of 10-70 seconds with a maximum attained sheet temperature of 210-250° C. is particularly suitable.

Further, metal sheets can be paint finished using the thermosetting compositions of the present invention. As metal sheet paint finishing methods, a metal sheet finishing method is mentioned for example wherein an undercoat paint is applied onto a metal sheet and thermally cured, a midcoat paint is as necessary applied on top of that undercoat paint film and thermally cured and, after this, any of the aforesaid thermosetting compositions are applied as a topcoat paint on top of the paint film, and thermally cured.

Here, "curing" means curing by drying or curing by means of a curing agent. Also, 0-300 parts by mass of pigment per 100 parts mass of total resin solids mass of component (A) and component (B) can be incorporated in the topcoat paints made from the thermosetting compositions of the present invention. The quantity of pigment incorporated is particularly preferably 0-100 parts by mass. Also, if pigment is incorporated, at least 0.1 parts by mass are preferably incorporated. As pigments, various pigments such as organic pigments and inorganic pigments can be used, and for example metal pigments such as aluminum, copper, brass, bronze or stainless steel, each surface-treated or micaceous iron oxide, metallic flake powders, or mica flakes coated with titanium oxide or iron oxide, are used. Further, apart from these, inorganic pigments such as titanium dioxide, iron oxide, yellow iron oxide or carbon black, organic pigments such as phthalocyanine blue, phthalocyanine green and quinacridone red pigments, extender pigments such as precipitated barium sulfate, clay, silica and talc, and the like are mentioned.

As the undercoat paint and midcoat paint, paints used as normal undercoat paints and midcoat paints can be used. As preferable specific examples of undercoat paints and midcoat paints, epoxy paints, polyester paints and polyester urethane paints are mentioned, and, as commercial products, Precolor primer HP32 and Precolor primer CF703 which are epoxy paints, Precolor primer FX31 which is a polyester paint, COILTEC U HP300 which is a polyester urethane paint (all BASF Japan (Corp.) brand names) and the like are mentioned. As regards the undercoat, midcoat and topcoat painting method, this can be performed by various painting methods, but painting methods by means of a roller coater, flow coater or spray or the like are preferable. Among these, in productivity and cost terms, the painting method by means of the roller coater, with which high-speed continuous painting in a painting line is possible is most ideal as the painted sheet painting method.

If the topcoat paint is applied with a roller coater, natural mode and reverse mode can be considered, but reverse mode is preferable for paint surface smoothness.

The paint films applied with the undercoat paint, midcoat paint and topcoat paint are each cured in order of application, and this curing can usually be performed under the curing conditions 100-300° C. for 5 seconds to 5 minutes, and for example in the precoat painting field where application is by coil coating or the like, curing is normally effected with the curing conditions 15-120 seconds with a maximum attained component temperature of 120-260° C. The undercoat paint film thickness is preferably 0.5-60 μm, the midcoat paint film thickness is preferably 0.5-60 μm, and the topcoat paint film thickness is preferably 0.5-100 μm.

As the metal sheet, various metal sheets can be used, and for example cold-rolled steel sheet, plated steel sheet such as zinc-plated steel sheet, aluminum-zinc-plated steel sheet, zinc-magnesium-plated steel sheet, aluminum-zinc-magnesium-plated steel sheet, hot-dip galvanized steel sheet (non-alloyed)/galvanized iron sheet, hot-dip galvanized steel sheet (alloyed), hot-dip zinc-aluminum alloy-plated steel sheet, stainless steel sheet, aluminum sheet or aluminum alloy sheet are mentioned.

When undercoat paint is applied onto metal sheet, a prepaint treatment of the surface of the metal sheet is preferably performed. As this prepaint treatment, any chemical conversion treatment used for precoat metal pretreatment can be used, and for example chromate chemical conversion treatment, phosphate chemical conversion treatment, complex oxide film treatment and the like are mentioned.

PRACTICAL EXAMPLES

Below, the present invention is explained in more detail by presenting practical examples, but the present invention is not limited to these. Also, unless specifically stated, parts, % and ratio in these examples respectively represent parts by mass, mass % and mass ratio.

Production Example

Production of Polyester Resin Solutions PE-1 to 13

The monomers shown in table 1 were introduced into a flask equipped with thermometer, Dean-Stark tube, reflux condenser, nitrogen inlet tube and stirrer, and gradually heated to 240° C. with stirring, then the reflux solvent (xylene) was introduced, and a dehydration condensation polymerization reaction was performed. When the acid value reached the values shown in table 1, the mixture was diluted to a solids content of 50% by addition of a mixed solvent (aromatic solvent "Solvesso 100" Exxon-Mobil Chemical Corp.)/cyclohexanone=50/50 (mass ratio). As a result, hydroxyl group-containing polyester resin solutions PE-1 to 13, wherein the solids content had the specific values shown in table 1 were obtained.

TABLE 1

Polyester resin production examples

| | | | Polyester resin solutions | | | | | | |
|---|---|---|---|---|---|---|---|---|---|
| | | | PE-1 | PE-2 | PE-3 | PE-4 | PE-5 | PE-6 | PE-7 |
| Monomers (parts by mass) | Polybasic carboxylic acid | isophthalic acid | 22.5 | 22.5 | 22.5 | 22.5 | 22.5 | 22.5 | 22.5 |
| | | phthalic anhydride | 14.8 | 14.8 | 14.8 | 14.8 | 14.8 | 14.8 | 14.8 |
| | | adipic acid | 19.43 | 18.66 | 18.88 | 19.3 | 19.43 | 19.97 | 19.45 |
| | Polyhydric alcohol | neopenty glycol | 23.6 | 32.3 | 29.8 | 21.6 | 20.2 | 41.5 | 19.5 |
| | | 1,6-hexanediol | 8.5 | 8.5 | 8.5 | 8.5 | 8.5 | 1.1 | 8.5 |
| | | trimethylolpropane | 11.17 | 3.24 | 5.52 | 13.3 | 14.57 | 0.13 | 15.25 |
| | Acid value | | 10 | 10 | 10 | 3 | 3 | 43 | 2 |
| | Percentage solids (%) | | 50% | 50% | 50% | 50% | 50% | 50% | 50% |
| Properties of solids | number average molecular weight (Mn) | | 3,000 | 1,500 | 1,750 | 5,500 | 8,000 | 800 | 11,000 |
| | hydroxyl value (mg KOH) | | 80 | 80 | 80 | 80 | 80 | 80 | 80 |

TABLE 1-continued

Polyester resin production examples

| | | | \multicolumn{6}{c}{Polyester resin solutions} | | | | | |
|---|---|---|---|---|---|---|---|---|
| | | | PE-8 | PE-9 | PE-10 | PE-11 | PE-12 | PE-13 |
| Monomers (parts by mass) | Polybasic carboxylic acid | isophthalic acid | 24.5 | 23.5 | 22.5 | 22.5 | 26.5 | 22.5 |
| | | phthalic anhydride | 18.8 | 16.8 | 14.8 | 14.8 | 20.8 | 14.8 |
| | | adipic acid | 16.58 | 18.22 | 17.41 | 16.56 | 14.01 | 15.53 |
| | Polyhydric alcohol | neopenty glycol | 34.1 | 30.5 | 13.8 | 10.2 | 35.5 | 6.3 |
| | | 1,6-hexanediol | 5.5 | 5.5 | 8.5 | 4.4 | 2.5 | 1.1 |
| | | trimethylolpropane | 0.52 | 5.48 | 22.99 | 31.54 | 0.69 | 39.77 |
| | Acid value | | 25 | 18 | 5 | 5 | 37 | 3 |
| | Percentage solids (%) | | 50% | 50% | 50% | 50% | 50% | 50% |
| Properties of solids | number average molecular weight (Mn) | | 3,000 | 3,000 | 3,000 | 3,000 | 3,000 | 3,000 |
| | hydroxyl value (mg KOH) | | 15 | 45 | 140 | 180 | 4 | 220 |

Production of Thermosetting Compositions PA-1 to PA-42

Among the components stated in table 2, titanium dioxide and component (A) were mixed, introduced into a ring mill and dispersed until the titanium dioxide particle size reached 10 μm or less. After this, the other components stated in table 2 were each added and mixed in, and thermosetting compositions PA-1 to PA-42 were obtained. The thermosetting compositions PA-1 to PA-42 obtained were subjected to viscosity adjustment to Ford Cup No. 4 80±10 seconds by means of the mixed solvent (aromatic solvent "Solvesso 100" Exxon-Mobil Chemical Corp.)/cyclohexanone=50/50 (mass ratio).

TABLE 2A

Thermosetting composition production examples

| | | PA-1 | PA-2 | PA-3 | PA-4 | PA-5 | PA-6 | PA-7 | PA-8 | PA-9 |
|---|---|---|---|---|---|---|---|---|---|---|
| Titanium dioxide | | 100.0 | 100.0 | 100.0 | 100.0 | 100.0 | 100.0 | 100.0 | 100.0 | 100.0 |
| A: polyester resin | | | | | | PE-1 | | | | |
| (solids content conversion) | | 71.2 | 79.1 | 77.1 | 62.2 | 52.2 | 89.2 | 45.4 | 70.0 | 66.7 |
| B: blocked isocyanate | B-1 | 28.8 | | | 37.8 | | 10.8 | | | |
| (solids content conversion) | B-2 | | 20.9 | | | 47.8 | | 54.6 | | |
| | B-3 | | | 22.9 | | | | | | |
| | B-4 | | | | | | | | 30.0 | |
| | B-5 | | | | | | | | | 33.3 |
| C: organotin compound | C-1 | 0.5 | | | | | 0.5 | | | |
| | C-2 | | 0.5 | | 0.5 | 0.5 | | 0.5 | 0.5 | 0.5 |
| | C-3 | | | 0.5 | | | | | | |
| | C-4 | | | | | | | | | |
| | C-5 | | | | | | | | | |
| D: organosilicate | D-1 | 5.0 | | | 5.0 | | | 5.0 | | |
| | D-2 | | 5.0 | | | 5.0 | | | 5.0 | |
| | D-3 | | | 5.0 | | | 5.0 | | | 5.0 |
| E: compound (E) | E-1 | 5.0 | | | 5.0 | | | 5.0 | | |
| | E-2 | | 5.0 | | | 5.0 | | | 5.0 | |
| | E-3 | | | 5.0 | | | 5.0 | | | 5.0 |
| Equivalents of component (B) relative to hydroxyl groups of component (A) | | 1 | 0.55 | 0.7 | 1.5 | 1.9 | 0.3 | 2.5 | 1 | 1 |
| Total resin solids content X of component (A) and component (B) | | 100.0 | 100.0 | 100.0 | 100.0 | 100.0 | 100.0 | 100.0 | 100.0 | 100.0 |
| Mass % of component (C) relative to total content X | | 0.50 | 0.50 | 0.50 | 0.50 | 0.50 | 0.50 | 0.50 | 0.50 | 0.50 |
| Mass % of component (D) relative to total content X | | 5.0 | 5.0 | 5.0 | 5.0 | 5.0 | 5.0 | 5.0 | 5.0 | 5.0 |
| Mass % of component (E) relative to total content X | | 5.0 | 5.0 | 5.0 | 5.0 | 5.0 | 5.0 | 5.0 | 5.0 | 5.0 |

TABLE 2A-continued

Thermosetting composition production examples

| | | Thermosetting composition | | | | | | | |
|---|---|---|---|---|---|---|---|---|---|
| | | PA-10 | PA-11 | PA-12 | PA-13 | PA-14 | PA-15 | PA-16 | PA-17 |
| Titanium dioxide | | 100.0 | 100.0 | 100.0 | 100.0 | 100.0 | 100.0 | 100.0 | 100.0 |
| A: polyester resin | | | | | PE-1 | | | | |
| (solids content conversion) | | 71.2 | 67.5 | 70.2 | 71.2 | 67.5 | 70.2 | 70.2 | 71.2 |
| B: blocked isocyanate | B-1 | 28.8 | | | 28.8 | | | | 28.8 |
| (solids content conversion) | B-2 | | 32.5 | | | 32.5 | | | |
| | B-3 | | | 29.8 | | | 29.8 | 29.8 | |
| | B-4 | | | | | | | | |
| | B-5 | | | | | | | | |
| C: organotin compound | C-1 | 0.1 | | | 3.0 | | | | |
| | C-2 | | 0.2 | | | 0.03 | 6.0 | | |
| | C-3 | | | 2.0 | | | | | |
| | C-4 | | | | | | | 0.5 | |
| | C-5 | | | | | | | | 0.5 |
| D: organosilicate | D-1 | 5.0 | | | 5.0 | | | 5.0 | |
| | D-2 | | 5.0 | | | 5.0 | | | 5.0 |
| | D-3 | | | 5.0 | | | 5.0 | | |
| E: compound (E) | E-1 | 5.0 | | | 5.0 | | | | 5.0 |
| | E-2 | | 5.0 | | | 5.0 | | | |
| | E-3 | | | 5.0 | | | 5.0 | 5.0 | |
| Equivalents of component (B) relative to hydroxyl groups of component (A) | | 1 | 1 | 1 | 1 | 1 | 1 | 1 | 1 |
| Total resin solids content X of component (A) and component (B) | | 100.0 | 100.0 | 100.0 | 100.0 | 100.0 | 100.0 | 100.0 | 100.0 |
| Mass % of component (C) relative to total content X | | 0.10 | 0.20 | 2.00 | 3.00 | 0.03 | 6.00 | 0.50 | 0.50 |
| Mass % of component (D) relative to total content X | | 5.0 | 5.0 | 5.0 | 5.0 | 5.0 | 5.0 | 5.0 | 5.0 |
| Mass % of component (E) relative to total content X | | 5.0 | 5.0 | 5.0 | 5.0 | 5.0 | 5.0 | 5.0 | 5.0 |

TABLE 2B

Thermosetting composition production examples

| | | Thermosetting composition | | | | | | | | | | | | |
|---|---|---|---|---|---|---|---|---|---|---|---|---|---|
| | | PA-18 | PA-19 | PA-20 | PA-21 | PA-22 | PA-23 | PA-24 | PA-25 | PA-26 | PA-27 | PA-28 | PA-29 | PA-30 |
| Titanium dioxide | | 100.0 | 100.0 | 100.0 | 100.0 | 100.0 | 100.0 | 100.0 | 100.0 | 100.0 | 100.0 | 100.0 | 100.0 | 100.0 |
| A: polyester resin | | | | | | | | PE-1 | | | | | | |
| (solids content conversion) | | 67.5 | 70.2 | 71.2 | 67.5 | 71.2 | 70.2 | 71.2 | 67.5 | 71.2 | 70.3 | 71.2 | 67.5 | 70.2 |
| B: blocked isocyanate (solids content conversion) | B-1 | | | 28.8 | | 28.8 | | 28.8 | | 28.8 | | 28.8 | | |
| | B-2 | 32.5 | | | 32.5 | | | | 32.5 | | | | 32.5 | |
| | B-3 | | 29.8 | | | | 29.8 | | | | 29.7 | | | 29.8 |
| | B-4 | | | | | | | | | | | | | |
| | B-5 | | | | | | | | | | | | | |
| C: organotin compound | C-1 | 0.5 | | | 0.5 | | | | 0.5 | | | | 0.5 | |
| | C-2 | | 0.5 | | | | 0.5 | | | | 0.5 | 0.5 | | 0.5 |
| | C-3 | | | 0.5 | | 0.5 | | 0.5 | | | | 0.5 | | |
| | C-4 | | | | | | | | | | | | | |
| | C-5 | | | | | | | | | | | | | |
| D: organosilicate | D-1 | | 3.0 | | | | 0.4 | | | | 5.0 | | | 5.0 |
| | D-2 | | | 10.0 | | | | 55.0 | | 5.0 | | 5.0 | | |
| | D-3 | 1.0 | | | 20.0 | | | | 5.0 | | | | 5.0 | |
| E. compound (E) | E-1 | | | 5.0 | | 5.0 | | 5.0 | | 0.3 | | 2.0 | | |
| | E-2 | 5.0 | | | 5.0 | | | | | | | | 10.0 | |
| | E-3 | | 5.0 | | | | 5.0 | | | | 0.5 | | | 20.0 |
| Equivalents of component (B) relative to hydroxyl groups of component (A) | | 1 | 1 | 1 | 1 | 1 | 1 | 1 | 1 | 1 | 1 | 1 | 1 | 1 |
| Total resin solids content X of component (A) and component (B) | | 100.0 | 100.0 | 100.0 | 100.0 | 100.0 | 100.0 | 100.0 | 100.0 | 100.0 | 100.0 | 100.0 | 100.0 | 100.0 |

TABLE 2B-continued

Thermosetting composition production examples

| | Thermosetting composition | | | | | | | | | | | | |
|---|---|---|---|---|---|---|---|---|---|---|---|---|
| | PA-18 | PA-19 | PA-20 | PA-21 | PA-22 | PA-23 | PA-24 | PA-25 | PA-26 | PA-27 | PA-28 | PA-29 | PA-30 |
| Mass % of component (C) relative to total content X | 0.50 | 0.50 | 0.50 | 0.50 | 0.50 | 0.50 | 0.50 | 0.50 | 0.50 | 0.50 | 0.50 | 0.50 | 0.50 |
| Mass % of component (D) relative to total content X | 1.0 | 3.0 | 10.0 | 20.0 | 0.0 | 0.4 | 55.0 | 5.0 | 5.0 | 5.0 | 5.0 | 5.0 | 5.0 |
| Mass % of component (E) relative to total content X | 5.0 | 5.0 | 5.0 | 5.0 | 5.0 | 5.0 | 5.0 | 0.0 | 0.3 | 0.5 | 2.0 | 10.0 | 20.0 |

TABLE 2C

Thermosetting composition production examples

| | | Thermosetting composition | | | | | | | | | | | |
|---|---|---|---|---|---|---|---|---|---|---|---|---|---|
| | | PA-31 | PA-32 | PA-33 | PA-34 | PA-35 | PA-36 | PA-37 | PA-38 | PA-39 | PA-40 | PA-41 | PA-42 |
| Titanium dioxide | | 100.0 | 100.0 | 100.0 | 100.0 | 100.0 | 100.0 | 100.0 | 100.0 | 100.0 | 100.0 | 100.0 | 100.0 |
| A: polyester resin | | PE-2 | PE-3 | PE-4 | PE-5 | PE-6 | PE-7 | PE-8 | PE-9 | PE-10 | PE-11 | PE-12 | PE-13 |
| (solids content conversion) | | 70.3 | 71.2 | 67.5 | 70.3 | 71.2 | 67.5 | 92.7 | 81.4 | 54.2 | 51.2 | 98.0 | 43.1 |
| B: blocked isocyanate | B-1 | | 28.8 | | | 28.8 | | | 18.6 | | | 2.0 | |
| (solids content conversion) | B-2 | | | 32.5 | | | 32.5 | | | 45.8 | | | 56.9 |
| | B-3 | 29.7 | | | 29.7 | | | 7.3 | | | 48.8 | | |
| | B-4 | | | | | | | | | | | | |
| | B-5 | | | | | | | | | | | | |
| C: organotin compound | C-1 | 0.5 | | | 0.5 | | | 0.5 | | | 0.5 | | |
| | C-2 | | 0.5 | | | 0.5 | | | 0.5 | | | 0.5 | |
| | C-3 | | | 0.5 | | | 0.5 | | | 0.5 | | | 0.5 |
| | C-4 | | | | | | | | | | | | |
| | C-5 | | | | | | | | | | | | |
| D: organosilicate | D-1 | 5.0 | | | 5.0 | | | 5.0 | | | 5.0 | | |
| | D-2 | | 5.0 | | | 5.0 | | | 5.0 | | | 5.0 | |
| | D-3 | | | 5.0 | | | 5.0 | | | 5.0 | | | 5.0 |
| E: compound (E) | E-1 | | 5.0 | | | 5.0 | | | 5.0 | | | 5.0 | |
| | E-2 | | | 5.0 | | | 5.0 | | | 5.0 | | | 5.0 | |
| | E-3 | 5.0 | | | 5.0 | | | 5.0 | | | | | | 5.0 |
| Equivalents of component (B) relative to hydroxyl groups of component (A) | | 1 | 1 | 1 | 1 | 1 | 1 | 1 | 1 | 1 | 1 | 1 | 1 |
| Total resin solids content X of component (A) and component (B) | | 100.0 | 100.0 | 100.0 | 100.0 | 100.0 | 100.0 | 100.0 | 100.0 | 100.0 | 100.0 | 100.0 | 100.0 |
| Mass % of component (C) relative to total content X | | 0.50 | 0.50 | 0.50 | 0.50 | 0.50 | 0.50 | 0.50 | 0.50 | 0.50 | 0.50 | 0.50 | 0.50 |
| Mass % of component (D) relative to total content X | | 5.0 | 5.0 | 5.0 | 5.0 | 5.0 | 5.0 | 5.0 | 5.0 | 5.0 | 5.0 | 5.0 | 5.0 |
| Mass % of component (E) relative to total content X | | 5.0 | 5.0 | 5.0 | 5.0 | 5.0 | 5.0 | 5.0 | 5.0 | 5.0 | 5.0 | 5.0 | 5.0 |

Here, the various components used in table 2 are as follows.

Component (B)

B-1: Desmodur BL3175 Sumika Bayer Urethane Corp., MEK oxime-blocked isocyanate, monomer type HDI, solids content 75%, NCO equivalents 378

B-2: Desmodur BL4265 Sumika Bayer Urethane Corp., MEK oxime-blocked isocyanate, monomer type IPDI, solids content 65%, NCO equivalents 519

B-3: Desmodur BL3272 Sumika Bayer Urethane Corp., ε-caprolactam-blocked isocyanate, monomer type HDI, solids content 72%, NCO equivalents 412

B-4: Desmodur BL3575/1 Sumika Bayer Urethane Corp., dimethylpyrazole-blocked isocyanate, monomer type HDI, solids content 75%, NCO equivalents 400

B-5: Product No. 7951 Baxenden Co, dimethylpyrazole-blocked isocyanate, monomer type IPDI, solids content 65%, NCO equivalents 539

Component (C)

C-1: monoethyltin tris(2-ethylhexanoate)
C-2: monobutyltin tris(2-ethylhexanoate)
C-3: monobutyltin trislaurate
C-4: dibutyltin dilaurate
C-5: dioctyltin dilaurate Component (D)

D-1: MKC silicate MS56 Mitsubishi Chemical Corp.
D-2: MKC silicate MS58B30 Mitsubishi Chemical Corp.
D-3: EMS-485 Colcoat Corp.

Component (E)
E-1: trimethyl orthoacetate
E-2: triethyl orthoformate
E-3: triethyl orthopropionate Preparation of Test Pieces The test pieces were prepared according to the methods (1) to (3) below, via the 2 coat 2 bake or 3 coat 3 bake methods.

(1) Undercoat Painting (1-1) Painting of Epoxy Resin Type Undercoat

An epoxy resin undercoat paint (brand name "Precolor Primer HP32", BASF Japan (Corp.)) was applied onto a 0.35 mm thick chemical conversion-treated aluminum/zinc alloy-plated steel sheet (Al 55%) with a bar coater to give a dry film thickness of 5 μm, and the undercoat paint film was formed by baking in a hot air dryer for 40 seconds with a maximum attained sheet temperature of 210° C.

(1-2) Painting of Polyester Urethane Type Undercoat

A polyester urethane undercoat paint (brand name "COILTEC U HP300", BASF Japan (Corp.)) was applied onto the same material as in (1-1) with a bar coater to give a dry film thickness of 25 μm, and the undercoat paint film was formed by baking in a hot air dryer for 40 seconds with a maximum attained sheet temperature of 230° C.

(2) Midcoat Painting

In practical examples 4 and 5, the thermosetting composition PA-22 was applied as midcoat onto the undercoat painted sheet previously painted by the method of (1-2), to give a dry film thickness of 5 μm, and the midcoat paint film was formed by baking in a hot air dryer for 40 seconds with a maximum attained sheet temperature of 230° C.

(3) Production of Topcoat Painted Sheet

The thermosetting compositions PA-1 to 42 were charged into test roller coaters, and while continuously rotating the pickup roller and applicator roller under the conditions in table 3, under the 3 conditions directly after charging, 2 hours after and 4 hours after, painting was intermittently performed on the undercoat painted sheet of (1), or the midcoat painted sheet of (2), and test pieces were obtained by forming topcoat films by baking in a hot air dryer for 40 seconds with a maximum attained sheet temperature of 230° C.

Table 3
Roller Coater Paint Machine Operating Conditions

TABLE 3

| Table 3 | Pickup roller circ. speed (m/min) | Applicator roller circ. speed (m/min) | Backing roller circ. speed (m/min.) |
|---|---|---|---|
| When idling | 20 | 20 | — |
| When painting | 50 | 80 | 65 |

[circ. = circumferential]

The following paint film performance assessments were performed on the 3 topcoat painted sheets obtained in each practical example and comparative example, and the results are shown in table 4. Those painted sheets which show normal performance not only directly after painting, but also after 2 hours and 4 hours are preferable.

(i) 60 Degree Specular Gloss and % Gloss Retention

The specular gloss of the painted sheets was measured directly afterwards, after 2 hours and after 4 hours, the % gloss retention of the painted sheets 2 hours and 4 hours after painting was calculated by the following equation (Num.1), and assessed by the following criteria.

$$\text{Gloss retention (\%)} = (60° \text{ specular gloss of target painted sheet})/(60° \text{ specular gloss of painted sheet directly after painting}) \times 100 \qquad [\text{Num.1}]$$

⊚: 90% or more
○: 80% to less than 90%
X: less than 80%

(ii) Bending Workability (1)

At 20° C. room temperature, a coated test piece cut to 5 cm width were bent around a 10 mmΦ cylindrical rod with the coated side facing outside to form U-shape. 6 coated sheets having the same thickness as that of the test piece were inserted into the inside of the U-shape, and they were pressed so that the test piece was bent to 180 degree. For assessment, the tips were examined with a 10× magnifying glass, and assessed by the following criteria.

⊚: no cracking
○: less than 20% cracking
Δ: 20-50% cracking
X: more than 50% cracking (iii) Bending Workability (2)

At 20° C. room temperature, the test piece was bent to 180 degree by the same method as Bending workability (1) with the exception that only 2 coated sheets were inserted into the U-shape. For assessment, after this they were peeled with cellophane adhesive tape, and assessed by the following criteria.

⊚: no peeling
○: less than 20% peeling
Δ: 20-50% peeling
X: more than 50% peeling (iv) Bending Workability (3)

At 20° C. room temperature, test pieces previously immersed in boiling water for 2 hours and then cut to 5 cm width were bent to 180 degree by the same method as Bending workability (1) with the exception that only 2 coated sheets were inserted into the U-shape. For assessment, after this they were peeled with cellophane adhesive tape, and assessed by the following criteria.

⊚: no peeling
○: less than 20% peeling
Δ: 20-50% peeling
X: more than 50% peeling (v) Hydrophilicity, Carbon Stain Resistance Each test piece was immersed for 12 hours in distilled water at room temperature, then the following tests were performed.

(v-a) Hydrophilicity

The distilled water contact angle with 2 μl liquid drop volume was measured with a Kyowa Interface Science Corp. DM-501 type contact angle meter.

⊚: contact angle=less than 40°
○: contact angle=40-50°
X: contact angle=more than 50°

(v-b) Carbon Stain Resistance

A mixture of distilled water: carbon black FW200 (Orion Engineered Carbons (Corp.))=90/10 (mass ratio) was applied onto the sheets, then, after drying for 2 hours at 40° C., they were washed in one direction 30 times with a dish-washing sponge scourer under running water. The color change (ΔE) before and after the test was measured and assessed by the following criteria:

⊚: ΔE=less than 2.0
○: ΔE=2.0 to 5.0
X: ΔE=more than 5.0

(vi) Rain Streak Stain Resistance

On a fixed house frontage-modelling platform at the BASF Japan (Corp.) Totsuka Works, test pieces (100 mm×200 mm×0.35 mm) were placed so that the paint surface faced northwards, an exposure test was performed, and test pieces exposed for 6 months were obtained.

The condition of the paint surface of each test piece was observed visually, and assessed according to the following criteria:

◎: no rain streak tracks observed
○: rain streak tracks observed to slight extent
X: rain streak tracks observed

TABLE 4A

|  |  | Practical Example | | | | | | | | |
|---|---|---|---|---|---|---|---|---|---|---|
|  |  | 1 | 2 | 3 | 4 | 5 | 6 | 7 | 8 | 9 |
| Undercoat | type | HP32 | HP300 | HP300 | HP300 | HP300 | HP32 | HP32 | HP32 | HP300 |
|  | thickness (μm) | 5 | 25 | 25 | 25 | 25 | 5 | 5 | 5 | 25 |
| Midcoat | type |  |  |  | PX22 | PA-22 |  |  |  |  |
|  | thickness (μm) |  |  |  | 5 | 5 |  |  |  |  |
| Topcoat | type | PA-1 | PA-1 | PA-2 | PA-1 | PA-2 | PA-3 | PA-4 | PA-5 | PA-10 |
|  | thickness (μm) | 20 | 20 | 20 | 20 | 20 | 20 | 20 | 20 | 20 |
|  | <Coating performance> | | | | | | | | | |
| Directly after | bending workability (1) | ○ | ◎ | ○ | ◎ | ○ | ◎ | ◎ | ○ | ◎ |
|  | bending workability (2) | ◎ | ◎ | ◎ | ◎ | ◎ | ◎ | ◎ | ◎ | ◎ |
|  | bending workability (3) | ◎ | ◎ | ◎ | ◎ | ◎ | ◎ | ◎ | ○ | ○ |
|  | hydrophilicity | ◎ | ◎ | ◎ | ◎ | ◎ | ◎ | ◎ | ◎ | ◎ |
|  | carbon staining | ◎ | ◎ | ◎ | ◎ | ◎ | ◎ | ◎ | ◎ | ○ |
|  | rain streak stain resistance | ◎ | ◎ | ◎ | ◎ | ◎ | ◎ | ◎ | ◎ | ◎ |
| After 2 hrs | % gloss retention | ◎ | ◎ | ◎ | ◎ | ◎ | ◎ | ◎ | ◎ | ◎ |
|  | bending workability (1) | ○ | ◎ | ○ | ◎ | ○ | ◎ | ◎ | ○ | ◎ |
|  | bending workability (2) | ◎ | ◎ | ◎ | ◎ | ◎ | ◎ | ◎ | ◎ | ◎ |
|  | bending workability (3) | ◎ | ◎ | ◎ | ◎ | ◎ | ◎ | ◎ | ○ | ○ |
|  | hydrophilicity | ◎ | ◎ | ◎ | ◎ | ◎ | ◎ | ◎ | ◎ | ◎ |
|  | carbon staining | ◎ | ◎ | ◎ | ◎ | ◎ | ◎ | ◎ | ◎ | ○ |
|  | rain streak stain resistance | ◎ | ◎ | ◎ | ◎ | ◎ | ◎ | ◎ | ◎ | ◎ |
| After 4 hrs | % gloss retention | ◎ | ◎ | ◎ | ◎ | ◎ | ◎ | ◎ | ◎ | ◎ |
|  | bending workability (1) | ○ | ◎ | ○ | ◎ | ○ | ◎ | ◎ | ○ | ◎ |
|  | bending workability (2) | ◎ | ◎ | ◎ | ◎ | ◎ | ◎ | ◎ | ◎ | ◎ |
|  | bending workability (3) | ◎ | ◎ | ◎ | ◎ | ◎ | ◎ | ◎ | ○ | ○ |
|  | hydrophilicity | ◎ | ◎ | ◎ | ◎ | ◎ | ◎ | ◎ | ◎ | ◎ |
|  | carbon staining | ◎ | ◎ | ◎ | ◎ | ◎ | ◎ | ◎ | ◎ | ○ |
|  | rain streak stain resistance | ◎ | ◎ | ◎ | ◎ | ◎ | ◎ | ◎ | ◎ | ◎ |

|  |  | Practical Example | | | | | | |
|---|---|---|---|---|---|---|---|---|
|  |  | 10 | 11 | 12 | 13 | 14 | 15 | 16 |
| Undercoat | type | HP300 | HP32 | HP32 | HP32 | HP300 | HP300 | HP300 |
|  | thickness (μm) | 25 | 5 | 5 | 5 | 25 | 25 | 25 |
| Midcoat | type |  |  |  |  |  |  |  |
|  | thickness (μm) |  |  |  |  |  |  |  |
| Topcoat | type | PA-11 | PA-12 | PA-13 | PA-18 | PA-19 | PA-20 | PA-21 |
|  | thickness (μm) | 20 | 20 | 20 | 20 | 20 | 20 | 20 |
|  | <Coating performance> | | | | | | | |
| Directly after | bending workability (1) | ◎ | ◎ | ◎ | ○ | ◎ | ◎ | ○ |
|  | bending workability (2) | ◎ | ◎ | ◎ | ◎ | ◎ | ◎ | ◎ |
|  | bending workability (3) | ○ | ○ | ○ | ○ | ◎ | ◎ | ○ |
|  | hydrophilicity | ◎ | ◎ | ◎ | ◎ | ◎ | ◎ | ◎ |
|  | carbon staining | ◎ | ◎ | ◎ | ◎ | ◎ | ◎ | ◎ |
|  | rain streak stain resistance | ◎ | ◎ | ◎ | ◎ | ◎ | ◎ | ◎ |
| After 2 hrs | % gloss retention | ◎ | ◎ | ◎ | ◎ | ◎ | ◎ | ◎ |
|  | bending workability (1) | ◎ | ◎ | ◎ | ○ | ◎ | ◎ | ○ |
|  | bending workability (2) | ◎ | ◎ | ◎ | ◎ | ◎ | ◎ | ◎ |
|  | bending workability (3) | ○ | ○ | ○ | ○ | ◎ | ◎ | ○ |
|  | hydrophilicity | ◎ | ◎ | ◎ | ◎ | ◎ | ◎ | ◎ |
|  | carbon staining | ◎ | ◎ | ◎ | ◎ | ◎ | ◎ | ◎ |
|  | rain streak stain resistance | ◎ | ◎ | ◎ | ◎ | ◎ | ◎ | ◎ |
| After 4 hrs | % gloss retention | ◎ | ◎ | ◎ | ○ | ○ | ◎ | ◎ |
|  | bending workability (1) | ◎ | ◎ | ◎ | ○ | ◎ | ◎ | ○ |
|  | bending workability (2) | ◎ | ◎ | ◎ | ◎ | ◎ | ◎ | ◎ |
|  | bending workability (3) | ○ | ○ | ○ | ○ | ◎ | ◎ | ○ |
|  | hydrophilicity | ◎ | ○ | ◎ | ◎ | ◎ | ◎ | ◎ |
|  | carbon staining | ◎ | ○ | ○ | ◎ | ○ | ◎ | ◎ |
|  | rain streak stain resistance | ◎ | ○ | ○ | ◎ | ◎ | ◎ | ◎ |

TABLE 4B

|  |  | Practical Example ||||||| 
| --- | --- | --- | --- | --- | --- | --- | --- | --- |
|  |  | 17 | 18 | 19 | 20 | 21 | 22 | 23 |
| Undercoat | type | HP300 | HP32 | HP32 | HP300 | HP300 | HP32 | HP32 |
|  | thickness (μm) | 25 | 5 | 5 | 25 | 25 | 5 | 5 |
| Topcoat | type | PA-25 | PA-26 | PA-27 | PA-28 | PA-29 | PA-30 | PA-31 |
|  | thickness (μm) | 20 | 20 | 20 | 20 | 20 | 20 | 20 |
|  | <Coating performance> |  |  |  |  |  |  |  |
| Directly after | bending workability (1) | ○ | ◎ | ◎ | ◎ | ○ | ◎ | ○ |
|  | bending workability (2) | ◎ | ◎ | ◎ | ◎ | ◎ | ◎ | ○ |
|  | bending workability (3) | ◎ | ◎ | ◎ | ◎ | ◎ | ◎ | ○ |
|  | hydrophilicity | ◎ | ◎ | ◎ | ◎ | ◎ | ◎ | ◎ |
|  | carbon staining | ◎ | ◎ | ◎ | ◎ | ◎ | ◎ | ◎ |
|  | rain streak stain resistance | ◎ | ◎ | ◎ | ◎ | ◎ | ◎ | ◎ |
| After 2 hrs | % gloss retention | ◎ | ◎ | ◎ | ◎ | ◎ | ◎ | ◎ |
|  | bending workability (1) | ○ | ◎ | ◎ | ◎ | ○ | ◎ | ○ |
|  | bending workability (2) | ◎ | ◎ | ◎ | ◎ | ◎ | ◎ | ○ |
|  | bending workability (3) | ◎ | ◎ | ◎ | ◎ | ◎ | ◎ | ○ |
|  | hydrophilicity | ◎ | ◎ | ◎ | ◎ | ◎ | ◎ | ◎ |
|  | carbon staining | ○ | ○ | ◎ | ◎ | ◎ | ◎ | ◎ |
|  | rain streak stain resistance | ○ | ◎ | ◎ | ◎ | ◎ | ◎ | ◎ |
| After 4 hrs | % gloss retention | ○ | ○ | ○ | ◎ | ◎ | ◎ | ◎ |
|  | bending workability (1) | ○ | ◎ | ◎ | ◎ | ○ | ◎ | ○ |
|  | bending workability (2) | ◎ | ◎ | ◎ | ◎ | ◎ | ◎ | ○ |
|  | bending workability (3) | ◎ | ◎ | ◎ | ◎ | ◎ | ◎ | ○ |
|  | hydrophilicity | ○ | ○ | ◎ | ◎ | ◎ | ◎ | ◎ |
|  | carbon staining | X | X | ○ | ◎ | ◎ | ◎ | ◎ |
|  | rain streak stain resistance | X | ○ | ◎ | ◎ | ◎ | ◎ | ◎ |

|  |  | Practical Example ||||||| 
| --- | --- | --- | --- | --- | --- | --- | --- | --- |
|  |  | 24 | 25 | 26 | 27 | 28 | 29 | 30 |
| Undercoat | type | HP300 | HP300 | HP32 | HP32 | HP32 | HP300 | HP300 |
|  | thickness (μm) | 25 | 25 | 5 | 5 | 5 | 25 | 25 |
| Topcoat | type | PA-32 | PA-33 | PA-34 | PA-37 | PA-38 | PA-39 | PA-40 |
|  | thickness (μm) | 20 | 20 | 20 | 20 | 20 | 20 | 20 |
|  | <Coating performance> |  |  |  |  |  |  |  |
| Directly after | bending workability (1) | ○ | ○ | ◎ | ◎ | ◎ | ○ | ○ |
|  | bending workability (2) | ◎ | ◎ | ◎ | ◎ | ◎ | ◎ | ◎ |
|  | bending workability (3) | ◎ | ◎ | ◎ | ◎ | ◎ | ◎ | ◎ |
|  | hydrophilicity | ◎ | ◎ | ◎ | ◎ | ◎ | ◎ | ◎ |
|  | carbon staining | ◎ | ◎ | ○ | ○ | ◎ | ◎ | ◎ |
|  | rain streak stain resistance | ◎ | ◎ | ◎ | ◎ | ◎ | ◎ | ◎ |
| After 2 hrs | % gloss retention | ◎ | ◎ | ◎ | ◎ | ◎ | ◎ | ◎ |
|  | bending workability (1) | ○ | ○ | ◎ | ◎ | ◎ | ○ | ○ |
|  | bending workability (2) | ◎ | ◎ | ◎ | ◎ | ◎ | ◎ | ◎ |
|  | bending workability (3) | ◎ | ◎ | ◎ | ◎ | ◎ | ◎ | ◎ |
|  | hydrophilicity | ◎ | ◎ | ◎ | ◎ | ◎ | ◎ | ◎ |
|  | carbon staining | ◎ | ◎ | ○ | ○ | ◎ | ◎ | ◎ |
|  | rain streak stain resistance | ◎ | ◎ | ◎ | ◎ | ◎ | ◎ | ◎ |
| After 4 hrs | % gloss retention | ◎ | ◎ | ◎ | ◎ | ◎ | ◎ | ◎ |
|  | bending workability (1) | ○ | ○ | ◎ | ◎ | ◎ | ○ | ○ |
|  | bending workability (2) | ◎ | ◎ | ◎ | ◎ | ◎ | ◎ | ◎ |
|  | bending workability (3) | ◎ | ◎ | ◎ | ◎ | ◎ | ◎ | ◎ |
|  | hydrophilicity | ◎ | ◎ | ◎ | ◎ | ◎ | ◎ | ◎ |
|  | carbon staining | ◎ | ◎ | ○ | ○ | ◎ | ◎ | ◎ |
|  | rain streak stain resistance | ◎ | ◎ | ◎ | ◎ | ◎ | ◎ | ◎ |

TABLE 4C

|  |  | Comparative Example | | | | | | | |
|---|---|---|---|---|---|---|---|---|---|
|  |  | 1 | 2 | 3 | 4 | 5 | 6 | 7 | 8 |
| Undercoat | type | HP32 | HP300 | HP32 | HP300 | HP300 | HP300 | HP32 | HP32 |
|  | thickness (μm) | 5 | 25 | 5 | 25 | 25 | 25 | 5 | 5 |
| Topcoat | type | PA-6 | PA-7 | PA-8 | PA-9 | PA-14 | PA-15 | PA-16 | PA-17 |
|  | thickness (μm) | 20 | 20 | 20 | 20 | 20 | 20 | 20 | 20 |
| <Coating performance> | | | | | | | | | |
| Directly after | bending workability (1) | ◎ | X | ◎ | ○ | ○ | ◎ | ◎ | ◎ |
|  | bending workability (2) | ◎ | X | ◎ | ◎ | ◎ | ◎ | ◎ | ◎ |
|  | bending workability (3) | X | X | ◎ | ○ | △ | ◎ | ◎ | ◎ |
|  | hydrophilicity | ◎ | ◎ | ◎ | ◎ | ◎ | ◎ | ◎ | ◎ |
|  | carbon staining | ○ | ○ | ◎ | ◎ | X | ◎ | ◎ | ◎ |
|  | rain streak stain resistance | ○ | ◎ | ◎ | ◎ | ○ | ◎ | ◎ | ◎ |
| After 2 hrs | % gloss retention | ◎ | ◎ | X | ○ | ◎ | ○ | X | ○ |
|  | bending workability (1) | ◎ | X | ◎ | ○ | ○ | ◎ | ◎ | ◎ |
|  | bending workability (2) | ◎ | X | ◎ | ◎ | ◎ | ◎ | ◎ | ◎ |
|  | bending workability (3) | X | X | ◎ | ○ | △ | ◎ | ◎ | ◎ |
|  | hydrophilicity | ◎ | ◎ | X | X | ◎ | ○ | X | X |
|  | carbon staining | X | ○ | X | X | X | X | X | X |
|  | rain streak stain resistance | X | ◎ | X | X | X | X | X | X |
| After 4 hrs | % gloss retention | ◎ | ◎ | X | X | ◎ | X | X | X |
|  | bending workability (1) | ◎ | X | ◎ | ○ | ○ | ◎ | ◎ | ◎ |
|  | bending workability (2) | ◎ | X | ◎ | ◎ | ◎ | ◎ | ◎ | ◎ |
|  | bending workability (3) | X | X | ◎ | ○ | △ | ◎ | ◎ | ◎ |
|  | hydrophilicity | ◎ | ◎ | X | X | ◎ | X | X | X |
|  | carbon staining | X | ○ | X | X | X | X | X | X |
|  | rain streak stain resistance | X | ○ | X | X | X | X | X | X |

|  |  | Comparative Example | | | | | | |
|---|---|---|---|---|---|---|---|---|
|  |  | 9 | 10 | 11 | 12 | 13 | 14 | 15 |
| Undercoat | type | HP32 | HP300 | HP300 | HP300 | HP300 | HP32 | HP300 |
|  | thickness (μm) | 5 | 25 | 25 | 25 | 25 | 5 | 25 |
| Topcoat | type | PA-22 | PA-23 | PA-24 | PA-35 | PA-36 | PA-41 | PA-42 |
|  | thickness (μm) | 20 | 20 | 20 | 20 | 20 | 20 | 20 |
| <Coating performance> | | | | | | | | |
| Directly after | bending workability (1) | ◎ | ◎ | X | △ | ◎ | ◎ | △ |
|  | bending workability (2) | ◎ | ◎ | X | △ | ◎ | ◎ | △ |
|  | bending workability (3) | ◎ | ◎ | X | X | △ | △ | X |
|  | hydrophilicity | X | ◎ | ◎ | ◎ | ◎ | ◎ | ◎ |
|  | carbon staining | X | ○ | ◎ | ◎ | X | X | ◎ |
|  | rain streak stain resistance | X | ○ | ◎ | ◎ | X | X | ◎ |
| After 2 hrs | % gloss retention | ◎ | ○ | ◎ | ◎ | ◎ | ◎ | ◎ |
|  | bending workability (1) | ◎ | ◎ | X | △ | ◎ | ◎ | △ |
|  | bending workability (2) | ◎ | ◎ | X | △ | ◎ | ◎ | △ |
|  | bending workability (3) | ◎ | ◎ | X | X | △ | △ | X |
|  | hydrophilicity | X | ○ | ◎ | ◎ | ◎ | ◎ | ◎ |
|  | carbon staining | X | X | ◎ | ◎ | X | X | ◎ |
|  | rain streak stain resistance | X | X | ◎ | ◎ | X | X | ◎ |
| After 4 hrs | % gloss retention | ◎ | X | ◎ | ◎ | ◎ | ◎ | ◎ |
|  | bending workability (1) | ◎ | ◎ | X | △ | ◎ | ◎ | △ |
|  | bending workability (2) | ◎ | ◎ | X | △ | ◎ | ◎ | △ |
|  | bending workability (3) | ◎ | ◎ | X | X | △ | △ | X |
|  | hydrophilicity | X | X | ◎ | ◎ | ◎ | ◎ | ◎ |
|  | carbon staining | X | X | ◎ | ◎ | X | X | ◎ |
|  | rain streak stain resistance | X | X | ◎ | ◎ | X | X | ◎ |

The invention claimed is:

1. A thermosetting composition comprising:
(A) a polyester resin of number average molecular weight 1,000-10,000 and hydroxyl value 5-200 mg KOH/g and,
(B) a blocked aliphatic polyisocyanate compound having reactivity to the hydroxyl groups of component (A), wherein the blocks are methyl ethyl ketone oxime and/or ε-caprolactam, and the blending ratio is in the range 0.5-2.0 equivalents of blocked isocyanate groups of component (B) relative to hydroxyl groups of component (A),
(C) 0.05 to 5 mass %, relative to the total resin solids mass of component (A) and component (B), of an organotin compound represented by the following general formula (I)

$$R^1\text{—Sn—}(O(C\!\!=\!\!O)\text{—}R^2)_3 \tag{I}$$

wherein $R^1$ represents an organic group of 1-24 carbons and is directly bound to the Sn atom via a C atom, $R^2$ represents an organic group of 1-24 carbons and is directly bound to the C atom of the (C=O) via a C atom, (D) 0.5 to 50 mass %, relative to the total resin solids mass of component (A) and component (B), of an organosilicate represented by the following general formula (II) and/or a condensation product thereof

(II)

wherein $R^3$, $R^4$, $R^5$ and $R^6$ are each a hydrogen atom or a 1-10 carbon organic group, and $R^4$ and $R^5$ are the same or different, and n is 1, and (E) 0.5 to 20 mass %, relative to the total resin solids mass of component (A) and component (B), of a compound represented by the following general formula (III)

(III)

wherein $R^7$ is a hydrogen atom or a 1-10 carbon organic group, each $R^8$ is independently a 1-10 carbon organic group, and n is 1 or 2.

2. A metal sheet paint finishing method, the method comprising applying the thermosetting composition according to claim 1 onto a metal sheet and thermally curing the composition.

3. The metal sheet paint finishing method of claim 2, wherein before application of the thermosetting composition an undercoat paint is applied onto the metal sheet and thermally cured and a midcoat paint is optionally applied on top of the undercoat paint film and thermally cured.

4. A painted article comprising a metal sheet painted according to the method of claim 3.

5. The paint finishing method as claimed in claim 2 wherein the thermosetting composition is applied with a roller coater.

6. A painted article comprising a metal sheet painted according to the method of claim 5.

7. The paint finishing method as claimed in claim 2, wherein the metal sheet is a cold-rolled steel sheet, a zinc-plated steel sheet, an aluminum-zinc-plated steel sheet, a zinc-magnesium-plated steel sheet, an aluminum-zinc-magnesium-plated steel sheet, a stainless steel sheet, an aluminum sheet or an aluminum alloy plate.

8. A painted article comprising a metal sheet painted according to the method of claim 7.

9. A painted article comprising a metal sheet painted according to the method of claim 2.

10. A thermoset paint material formed by thermally curing the composition of claim 1.

* * * * *